US009133946B2

(12) United States Patent
Nguyen et al.

(10) Patent No.: US 9,133,946 B2
(45) Date of Patent: Sep. 15, 2015

(54) SLAM-SHUT SAFETY DEVICE HAVING A CAGE

(71) Applicant: FISHER CONTROLS INTERNATIONAL LLC, Marshalltown, IA (US)

(72) Inventors: Tung K. Nguyen, McKinney, TX (US); Guillaume Fournel, Rambouillet (FR); Roman Alexandru-Vlad, Cluj-Napoca (RO)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 160 days.

(21) Appl. No.: 13/689,460

(22) Filed: Nov. 29, 2012

(65) Prior Publication Data

US 2013/0133755 A1  May 30, 2013

Related U.S. Application Data

(60) Provisional application No. 61/565,240, filed on Nov. 30, 2011.

(51) Int. Cl.
*F16K 31/12* (2006.01)
*F16K 17/04* (2006.01)

(52) U.S. Cl.
CPC .................................. *F16K 17/042* (2013.01)

(58) Field of Classification Search
CPC ...... F16K 17/00; F16K 17/165; F16K 17/042

USPC .............. 137/456, 458, 463, 536, 540, 542, 137/543.21, 14; 251/74

See application file for complete search history.

(56) References Cited

U.S. PATENT DOCUMENTS

| 2,143,399 | A | * | 1/1939 | Abercrombie | ................ | 137/540 |
| 2,950,736 | A | * | 8/1960 | Oldberg | ........................ | 137/529 |
| 4,134,421 | A | | 1/1979 | Cameron | | |
| 4,245,667 | A | * | 1/1981 | Braukmann | .................. | 137/493 |
| 2002/0162591 | A1 | | 11/2002 | Baumann | | |
| 2008/0257420 | A1 | | 10/2008 | Faillat et al. | | |

OTHER PUBLICATIONS

Search Report for PCT/US2012/067018, mailed Feb. 28, 2013.
Written Opinion for PCT/US2012/067018, mailed Feb. 28, 2013.
International Preliminary Report on Patentability for International application No. PCT/US2012/067018, dated Jun. 3, 2014.

\* cited by examiner

*Primary Examiner* — Kevin Lee
*Assistant Examiner* — P. Macade Nichols
(74) *Attorney, Agent, or Firm* — Marshall, Gerstein & Borun LLP

(57) ABSTRACT

A slam-shut device includes an inlet, an outlet, a valve seat, and defines a flow path. A valve disc is shiftable between an open position and a closed position, and reset pin responsive to an actuator is coupled to the valve disc and shifts between an untripped position and a tripped position. A cylindrical cage is mounted within the valve body and is disposed in the flow path, and includes a plurality of flow apertures slidably receives the valve disc. The cage includes a first end adjacent the valve seat and a second end away from the valve seat, and the cage forms a cylindrical recess disposed adjacent the second end of the cage and spaced from the flow apertures.

14 Claims, 9 Drawing Sheets

SLAM-SHUT SAFETY DEVICE HAVING A CAGE

BACKGROUND OF THE INVENTION

1. Field of the Disclosure

The disclosure generally relates to slam-shut safety devices for gas distribution systems, and specifically relates to slam-shut safety device having a cage surrounding the valve disc of the slam-shut safety device.

2. Related Technology

Gas distribution systems, such as systems used to distribute natural gas, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used for this purpose. For example, U.S. Pat. No. 4,134,421, which is hereby incorporated by reference, discloses a slam-shut safety valve that provides overpressure protection in a pipeline. Another example of a slam-shut safety valve is disclosed in U.S. Pat. No. 8,225,812, which also is incorporated by reference herein. The slam-shut safety valve is generally disposed upstream of the pressure regulating valve so that the slam-shut valve may prevent gas from reaching the pressure regulating valve in the event of the pressure regulating valve has failed. The slam-shut safety valve monitors gas pressure downstream of the pressure regulating valve for maximum and minimum pressure tolerances. If the downstream pressure exceeds either the maximum or minimum tolerance, the slam-shut safety valve closes, cutting off the flow of gas to the pressure regulating valve and preventing an uncontrolled leak of gas due to the pressure regulating valve failure.

Known slam-shut safety valves have a valve disc that covers a valve orifice in the vicinity of a valve seat when an overpressure or underpressure condition is sensed. The valve disc is coupled to a reset pin, and the reset pin in turn is attached to an actuator that senses the overpressure or underpressure condition. The reset pin is typically in the open or untripped position, which places the valve disc away from the valve seat in an open position. Should the actuator sense the appropriate trip condition, the actuator releases the reset pin, and the valve disc shifts to the closed position against the valve seat.

In conventional slam-shut devices, the valve disc is exposed to the flow of fluid. Moreover, in certain flow conditions, such as relatively high flow conditions, suction on the valve disc may impede the functionality of the slam-shut device.

SUMMARY OF THE DISCLOSURE

A slam-shut safety device includes a valve body, the valve body having an inlet, an outlet, and defining a flow path extending between the inlet and the outlet, the valve body including a valve seat surrounding an orifice disposed between the inlet and the outlet. A valve disc is provided, the valve disc being disposed within the valve body and shiftable between an open first position in which the valve disc is spaced away from the valve seat, and a closed second position in which the valve disc is seated against the valve seat. A reset pin is operatively coupled to the valve disc and is shiftable relative to the valve body between an untripped position placing the valve disc in the open first position and a tripped position placing the valve disc in the closed second position. The reset pin is arranged to respond to an actuator to shift the reset pin from the untripped position toward the tripped position. A cage is mounted within the valve body and disposed in the flow path, the cage sized to slidably receive the valve disc. The cage includes a plurality of flow apertures.

In accordance with one or more preferred aspects, the device includes a spring disposed within the valve body, with the spring operatively coupled to the valve disc and arranged to bias the valve disc toward the closed second position. The cage preferably is cylindrical and includes a first end mounted adjacent the valve seat and a second end spaced away from the valve seat, and the valve disc may be retracted past the plurality of apertures and into a recess formed by the cage when the valve disc is in the open first position. The valve disc preferably is shiftable along an axis, and the cage may be cylindrical and provided with a plurality of longitudinal guides extending parallel to the axis of the valve disc, each of the plurality of apertures bounded by the longitudinal guides. Each of the plurality of apertures may extend at least partially along a circumference of the cage. Further, the cage may include a slot extending parallel to the axis between the first end and the second end.

Each of the plurality of apertures may extend partially along a circumference of the cage, and each of the plurality of apertures may be bounded by a first circumferentially extending edge disposed toward the first end of the cage, a second circumferentially extending edge disposed toward the second end of the cage, and a pair of side edges extending parallel to the axis. The recess may be spaced away from the second circumferentially extending edges and adjacent the second end of the cage.

In accordance with another exemplary form, a slam-shut safety device may comprise a valve body having an inlet, an outlet, and defining a flow path extending between the inlet and the outlet, with the valve body including a valve seat surrounding an orifice disposed between the inlet and the outlet. A valve disc is disposed within the valve body and is shiftable between an open first position in which the valve disc is spaced away from the valve seat, and a closed second position in which the valve disc is seated against the valve seat. A reset pin is operatively coupled to the valve disc and is shiftable relative to the valve body between an untripped position placing the valve disc in the open first position and a tripped position placing the valve disc in the closed second position, with the reset pin arranged to respond to an actuator to shift the reset pin from the untripped position toward the tripped position. A cylindrical cage is mounted within the valve body and is disposed in the flow path, with the cage including a plurality of flow apertures. The cage is sized to slidably receive the valve disc. The cage includes a first end mounted adjacent the valve seat and a second end spaced away from the valve seat, and the cage is sized to form a cylindrical recess disposed adjacent the second end of the cage and spaced away from the flow apertures. The cylindrical recess is sized to receive the valve disc when the valve disc is in the open first position.

In accordance with another aspect, a method of assembling a slam-shut safety device includes the steps of providing a valve body having an inlet, an outlet, and defining a flow path extending between the inlet and the outlet, mounting a valve seat in the valve body, the valve seat surrounding an orifice disposed in the valve body between the inlet and the outlet, and placing a valve disc sized to fit within the valve body and arranging the valve disc to shift between an open first position in which the valve disc is spaced away from the valve seat, and a closed second position in which the valve disc is seated against the valve seat. The method includes operatively coupling a reset pin to the valve disc and arranging the reset pin to shift relative to the valve body between an untripped position placing the valve disc in the open first position and a tripped position placing the valve disc in the closed second position, the reset pin arranged to respond to an actuator to shift the reset pin from the untripped position toward the tripped position. The method further includes mounting a cylindrical cage within the valve body to place the cage in the flow path, providing the cage with a plurality of flow apertures, and sizing the cage to slidably receive the valve disc. Further, the method includes placing the cage within the valve body with a first end of the cage mounted adjacent the valve seat and with a second end of the cage spaced away from the valve seat, and forming a cylindrical recess in the cage adjacent the second end of the cage and spaced away from the flow apertures, the cylindrical recess sized to receive the valve disc when the valve disc is in the open first position.

DETAILED DESCRIPTION

Figure 1:
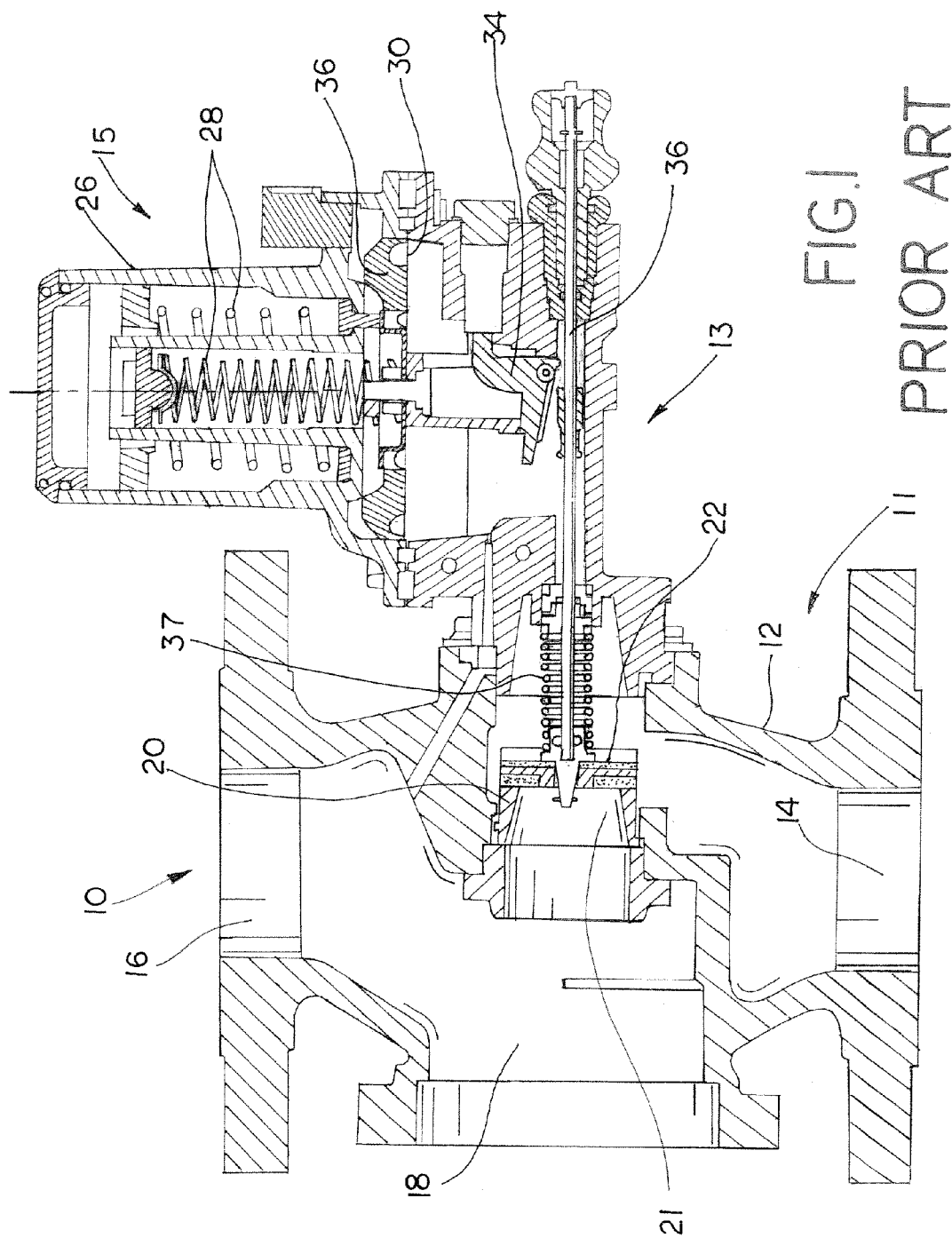
FIG. 1 is a cross-sectional view of a prior art slam-shut safety valve and showing the valve disc in a closed position.
Figure 2:
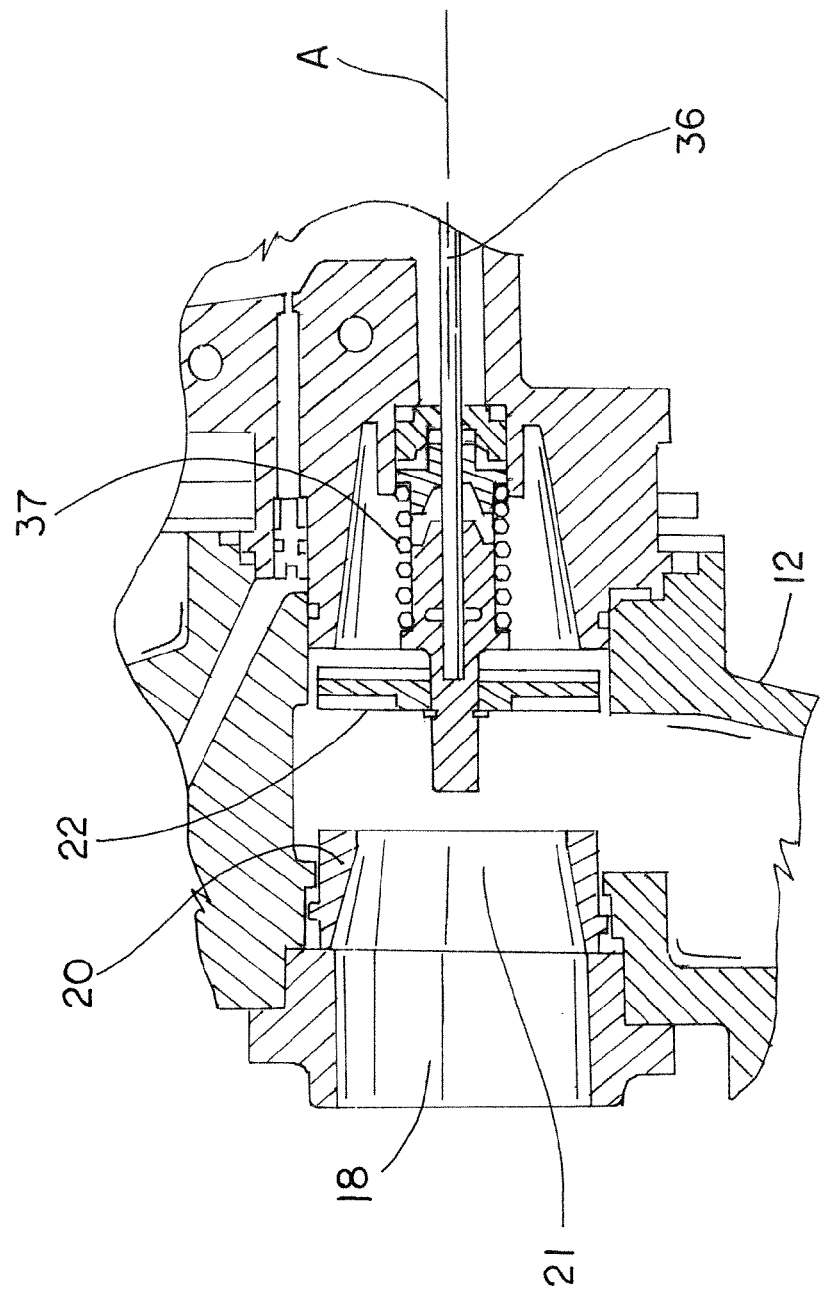
FIG. 2 is an enlarged fragmentary cutaway view in perspective of a portion of the slam-shut safety valve of FIG. 1, but showing the valve disc in an open position.

Turning now to the drawings, FIGS. 1 and 2 illustrate one example of a known slam-shut safety device 10. The slam-shut safety device 10 may be attached to a main regulator (not shown) in a gas distribution system to provide a safety shutoff capability in the event of main regulator failure. The slam-shut safety device 10 includes a valve portion 11, a slam-shut portion 13, and an actuator 15. The valve portion 11 includes a valve body 12 having a fluid inlet 14, and a fluid outlet 16 connected by a fluid passage forming a flow path 18. A valve seat 20 is disposed within the valve body 12 and defines a flow orifice 21 forming a portion of the flow path 18. Consequently, fluid flowing through the slam-shut safety device 10 flows from the fluid inlet 14, through the flow path 18 including the valve seat 20 (and the flow orifice 21 formed by the valve seat 20) to the fluid outlet 16.

The slam-shut portion 13 includes a valve disc 22 that cooperates with the valve seat 20 to restrict fluid flow through the slam-shut safety device 10 when an overpressure or underpressure condition is sensed downstream of the main regulator. The valve disc 22 slides within the valve body 12 toward the valve seat 20 in order to close the fluid orifice 21, and away from the valve seat 20 in order to open the fluid orifice 21. Typically, the actuator 15 includes a housing 26 enclosing one or more springs 28, and the springs 28 are typically connected to a diaphragm 30. The diaphragm 30 is sensitive to pressure changes within the actuator 15 and moves within the actuator housing 26 in response to pressure changes. The diaphragm 30 is connected to a back plate 32, which moves longitudinally within the housing 26 in conjunction with the diaphragm 30. The back plate 32 interacts with a cam 34 to engage or release a reset pin 36. The reset pin 36 is shiftable along an axis A relative to the valve body 12 between a retracted or untripped position in which the valve disc 22 is spaced away from the valve seat 20 in an open position opening the flow orifice 21, and a tripped position in which the valve disc 22 is seated against the valve seat 20 in a closed position closing the flow orifice 21.

The slam-shut portion includes a spring 37 or other suitable biasing mechanism, which acts to bias the valve disc 22 toward the closed position. Consequently, the reset pin 36 is shiftable between the untripped position and the tripped position when the actuator 15 senses either an overpressure condition or an underpressure condition. The actuator 15 causes the cam 34 to release the reset pin 36, such that the spring 37 causes the reset pin 36 and hence the valve disc 22 to slide toward the valve seat 20, ultimately bringing the valve disc 22 into contact with the valve seat 20, thus closing the flow orifice 21 and shutting off fluid flow through the flow path 18. FIG. 2 illustrates a close up view of the slam-shut portion 13 of the slam-shut safety device 10. The reset pin 36 is shown attached to the valve disc 22, with the reset pin 36 disposed in the untripped position placing the valve disc 22 in the open position spaced away from the valve seat 20. Those of skill in the art will readily understand that the reset pin 36, when positioned in the untripped position, may be held in place by the cam 34 or other suitable latching mechanism, such that the cam 34 releasably holds the reset pin 36 in the armed or untripped position with the valve disc 22 spaced away from the valve seat 20. When the cam 34 is activated by the actuator 15, the cam 34 releases the reset pin 36, and the valve disc 22 slides or otherwise shifts toward the valve seat 20 to close the slam-shut safety device 10, preventing fluid flow through the flow path 18.

Figure 3:
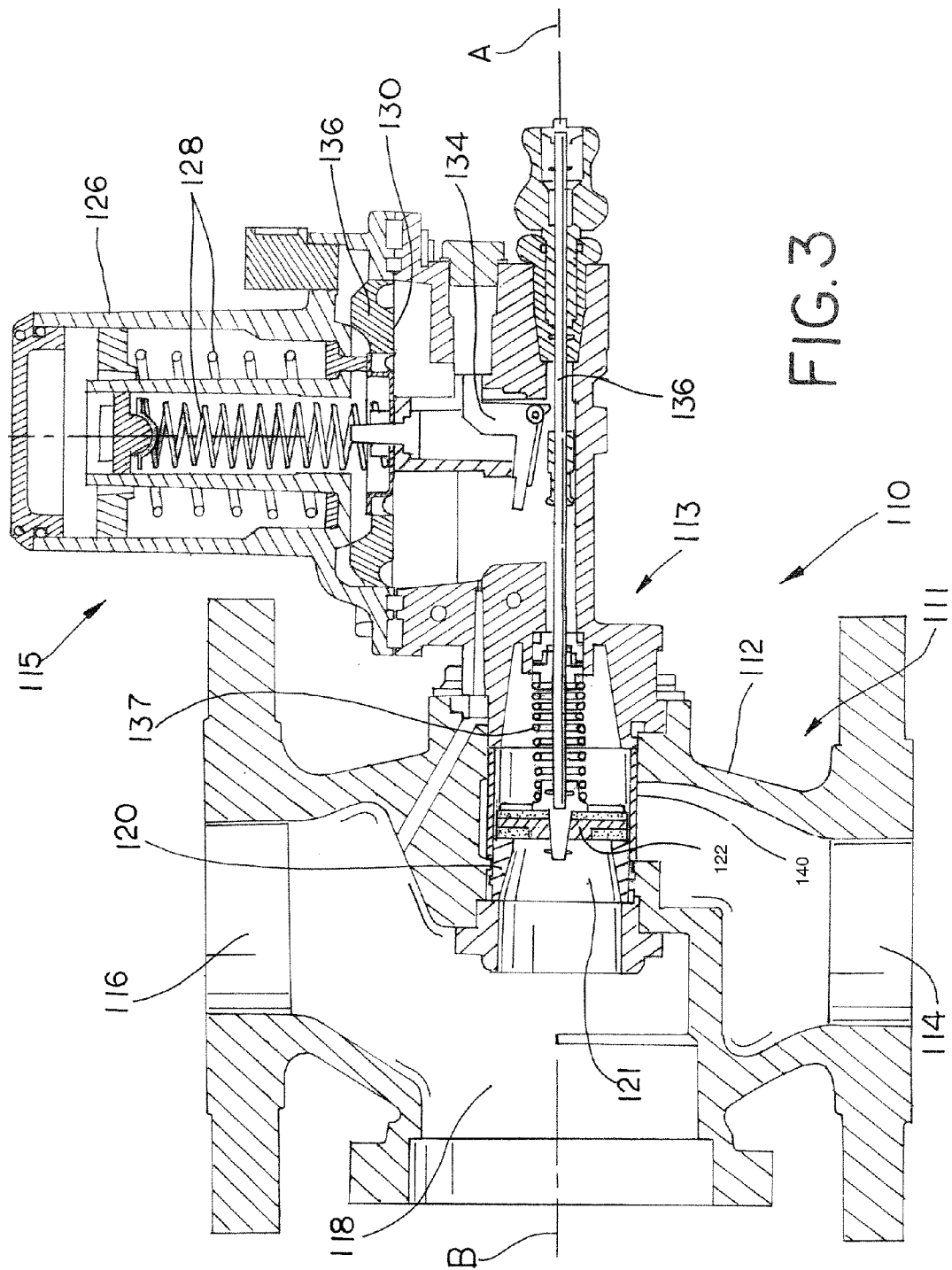
FIG. 3 is a cross-sectional view of a slam-shut safety valve assembled in accordance with the teachings of a disclosed example of the present invention incorporating a safety cage around the valve disc and showing the valve disc in the closed position.
Figure 4:
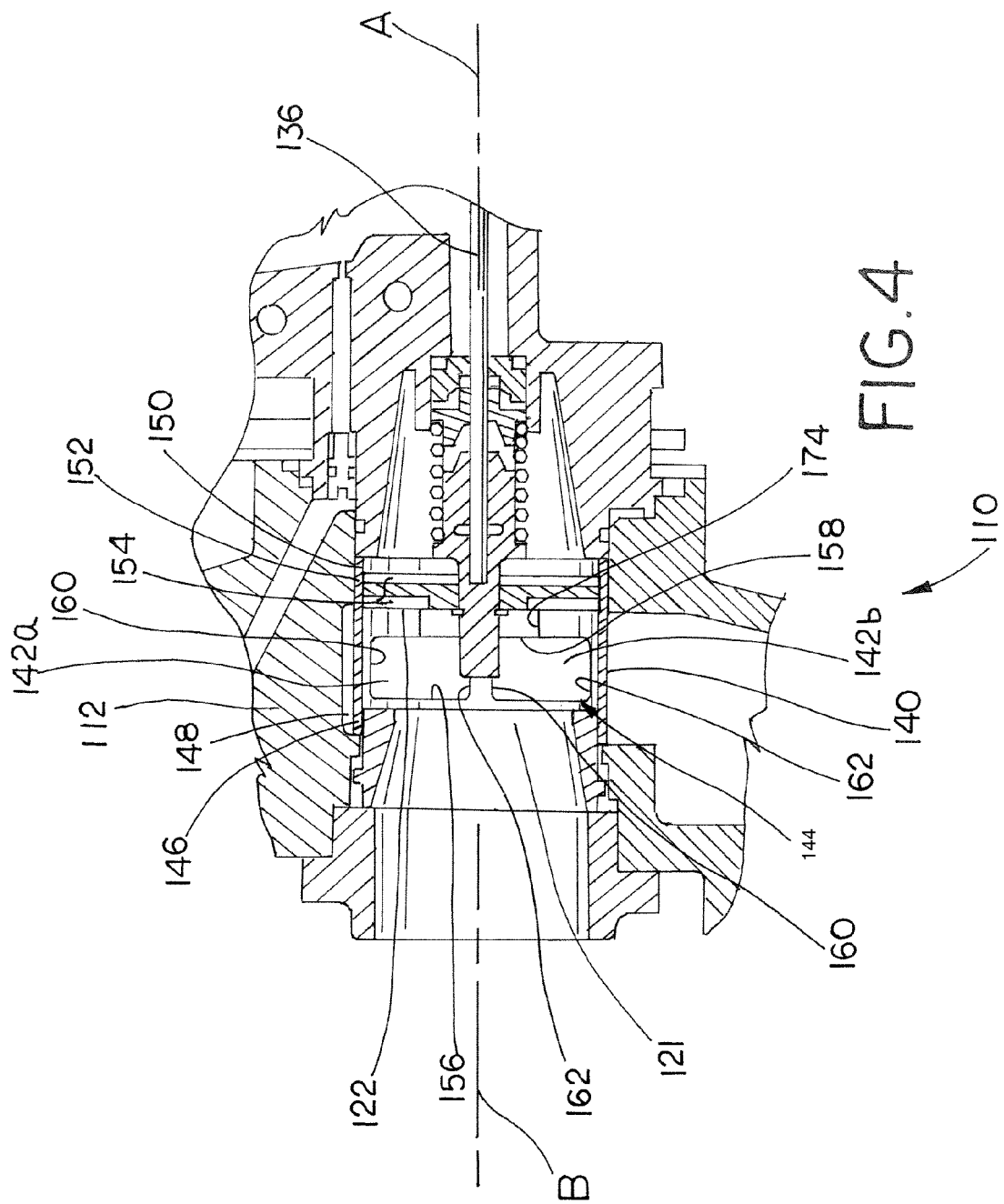
FIG. 4 is an enlarged fragmentary cutaway view in perspective of a portion of the slam-shut safety valve of FIG. 3, but showing the valve disc in an open position.

Referring now to FIGS. 3 and 4, a slam-shut safety device assembled in accordance with the teachings of the present invention is shown and is referred to by the reference numeral 110. The slam-shut safety device 110 may be similar to the slam-shut safety device 10 discussed above with respect to FIGS. 1 and 2, and therefore the same or similar components will have the same reference numerals, although the reference numerals will be increased by 100. Once again, the slam-shut safety device 110 may be attached to a main regulator (not shown) in a gas distribution system to provide a safety shutoff capability in the event of main regulator failure. As shown in FIG. 3, the slam-shut safety device 110 includes a valve portion 111, a slam-shut portion 113, and an actuator 115. The valve portion 111 includes a valve body 112 having a fluid inlet 114 and a fluid outlet 116, with the inlet 114 and the outlet 116 being connected by a fluid passage forming a flow path 118. As shown in FIGS. 3 and 4, a valve seat 120 is disposed within the valve body 112 and defines a flow orifice 121 forming a portion of the flow path 118. Consequently, fluid flowing through the slam-shut safety device 110 flows from the fluid inlet 114, through the flow path 118 including the valve seat 120 (and the flow orifice 121 formed by the valve seat 120) to the fluid outlet 116. The slam-shut safety device 110 includes a cage 140 mounted within the valve body 112 so as to be disposed in the flow path 118. The cage 140 is sized and shaped to receive the valve disc 122 as will be discussed in greater detail below.

Preferably, the valve disc 122 is round, and consequently the cage 140 preferably is preferably generally cylindrical and defines an axis B. When the cage 140 is disposed within the valve body 112 as outlined herein, the axis B is positioned to be generally parallel to the axis A of the reset pin 136. Still further, the axis A and the axis B are aligned to be generally coaxial with one another. The cage 140 includes at least one flow aperture 142 or a plurality of flow apertures 142. In the example of FIG. 4 discussed in greater detail below, the cage 140 includes a plurality of flow apertures 142a, 142b, 142c, and 142d. Only a pair of flow apertures is visible in the cross-section of FIG. 4, although all of the flow apertures are shown in greater detail in, for example, FIG. 5 through 9.

As with the example of FIGS. 1 and 2, the slam-shut portion 113 includes a valve disc 122 that cooperates with the valve seat 120 to restrict fluid flow through the slam-shut safety device 110 when an overpressure or underpressure condition is sensed downstream of the main regulator. The valve disc 122 shifts within the valve body 112 toward the valve seat 120 in order to close the fluid orifice 121, and further shifts away from the valve seat 20 in order to open the fluid orifice 121. Typically, the actuator 115 includes a housing 126 enclosing one or more springs 128, and the springs 128 are typically connected to a diaphragm 130. The diaphragm 130 is sensitive to pressure changes within the actuator 115 and moves within the actuator housing 126 in response to pressure changes. The diaphragm 130 is connected to a back plate 132, which moves longitudinally within the housing 126 in conjunction with the diaphragm 130. The back plate 132 interacts with a cam 134 to engage or release a reset pin 136. The reset pin 136 is shiftable along an axis A relative to the valve body 112 between a retracted or untripped position in which the valve disc 122 is spaced away from the valve seat 120 in an open position opening the flow orifice 121, and a tripped position in which the valve disc 122 is seated against the valve seat 120 in a closed position closing the flow orifice 121. The slam-shut portion includes a spring 137 or other suitable biasing mechanism, which acts to bias the valve disc 122 toward the closed position. Consequently, the reset pin 136 is shiftable between the untripped position and the tripped position when the actuator 115 senses either an overpressure condition or an underpressure condition. The actuator 115 causes the cam 134 to release the reset pin 136, such that the spring 137 causes the reset pin 136 and hence the valve disc 122 to slide or otherwise shift toward the valve seat 120, ultimately bringing the valve disc 122 into contact with the valve seat 120, thus closing the flow orifice 121 and shutting off fluid flow through the flow path 118.

Referring now to FIG. 4, the cage 140 is shown mounted within the valve body 112. Specifically, the valve body 112 includes a receiving area 144. The cage 140 includes a first end 146 disposed in a first receiving area 148 formed by the valve body 112 and disposed generally adjacent the valve seat 120. The cage 140 also includes a second end 150 disposed in a second receiving area 152 also formed by the valve body 112 and disposed generally away from the valve seat 120. In FIG. 4, the valve disc 122 is shown in the open position spaced away from the valve seat 120 and into a recess 154 formed by the cage 140. In the open position shown in FIG. 4, the valve disc 122 is retracted or otherwise positioned past the plurality of apertures 142a-142d (only the apertures 142a and 142b are visible in FIG. 4), and into the recess 154.

Figure 5:
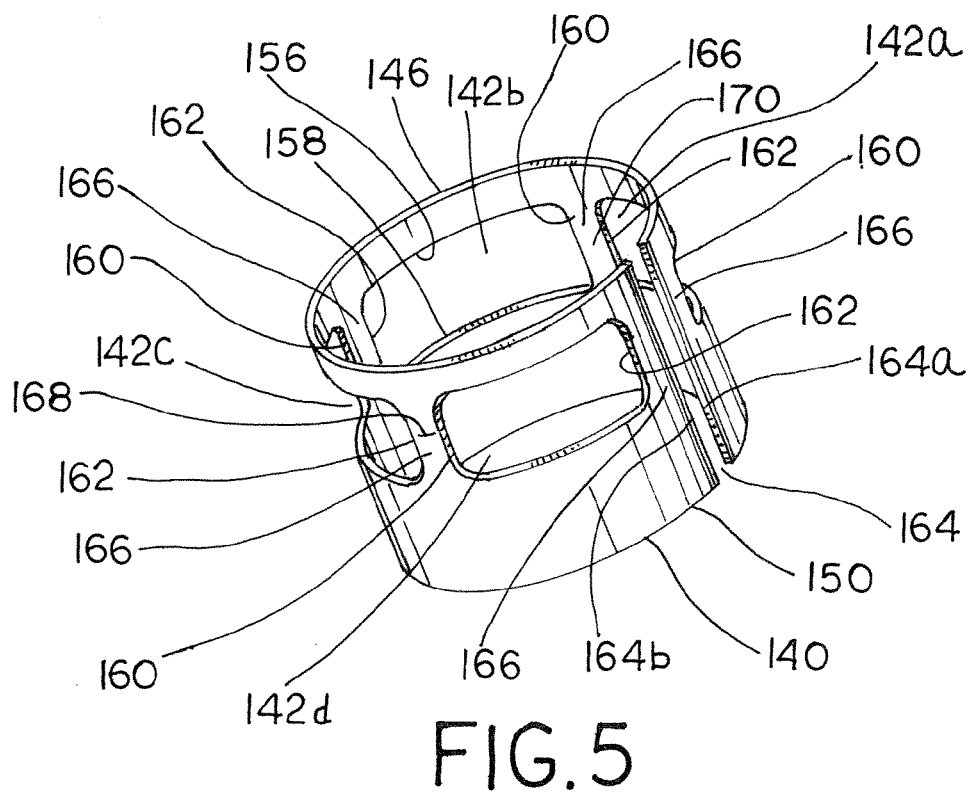
FIG. 5 is an enlarged perspective view of the safety cage for use in the slam-shut safety valve of FIG. 3.

As shown in FIGS. 4 and 5, each of the apertures 142a-142d extends in a generally circumferential direction, with each of the apertures 142a-142d preferably extending partially along a circumference of the cage 140. Each of the apertures 142a-142d includes a first edge 156 disposed generally toward or otherwise adjacent the first end 146 of the cage 140, and also includes a second edge 158 disposed generally toward the second end 150 of the cage 140. Each of the apertures 142a-142d also includes a pair of side edges 160, 162 extending between the corresponding first and second edges 156, 158. Each of the first and second edges 156 and 158 extends partially about the cylindrical cage 140 in a generally circumferential direction (extending around the axis B), while each of the side edges 160 and 162 extends in a direction that is generally parallel to the axis B of the cage 140.

In the example shown in FIG. 5, the cage 140 includes a slot 164 extending between the first end 146 and the second end 150 in a direction that is parallel to the axis B of the cage 140. The slot 164 is defined by opposite ends 164a and 164b of the cage 140 as will be explained in greater detail below. As shown in FIG. 5, the cage 140 also includes a plurality of sections 166, each of which extends longitudinally in a direction parallel to the axis B, and each of which is bounded by at least one or a pair of the side edges 160, 162 of the apertures 142a-142d. Each of the sections 166 includes a width 168, and preferably the sections 166 form an inner longitudinally extending guide 170. The cage 140 is preferably sized so that the guides 170 function to guide the valve disc 122 when the valve disc 122 shifts between the open and closed positions outlined above.

Figure 6:
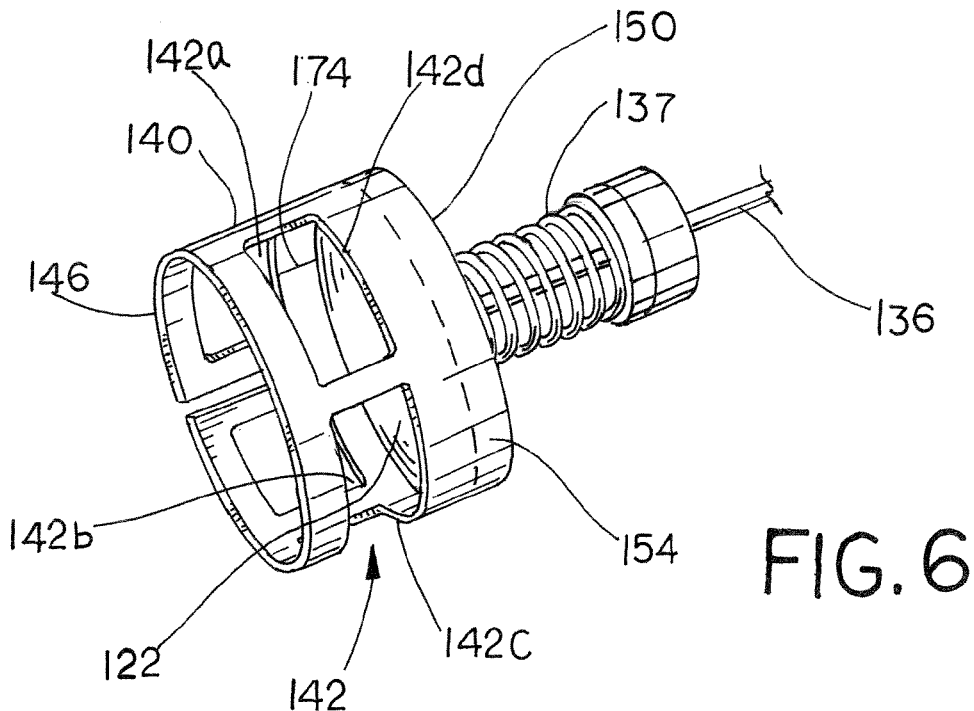
FIG. 6 is an enlarged fragmentary view in perspective illustrating the valve disc disposed within the safety cage.

Referring now to FIGS. 4 and 6, when the valve disc 122 is shifted away from the valve seat 120 and into the recess 154, a front surface 172 of the valve disc 122 is separated from the second edge 158 of the adjacent apertures 142 by a gap 174. Consequently, when assembled in accordance with the disclosed example, when the valve disc 122 is disposed in the recess 154, the cage 140 acts to protect the valve disc 122. For example, in relatively high flow situations (for example, at flows higher than 2000 cubic feet per hour), the suction force acting on the valve disc 122 may be high enough to impede the functionality of the slam-shut device 110. The cage 140 assembled in accordance with the example discussed herein preferably acts to lessen or minimize the suction force. Still further, in relatively high flow situations, the recess 154 formed by the cage 140 protects the valve disc 122. Such a benefit may be achieved by preventing flow from directly contacting the front surface 172 of the valve disc 122, and/or by preventing flow from directly contacting an edge of the valve disc 122. Consequently, a slam-shut device 110 assembled in accordance with the teachings outlined herein may experience improved performance and/or improved reliability. These and other benefits may be further enhanced by providing the longitudinally extending guides 170.

Figure 8:
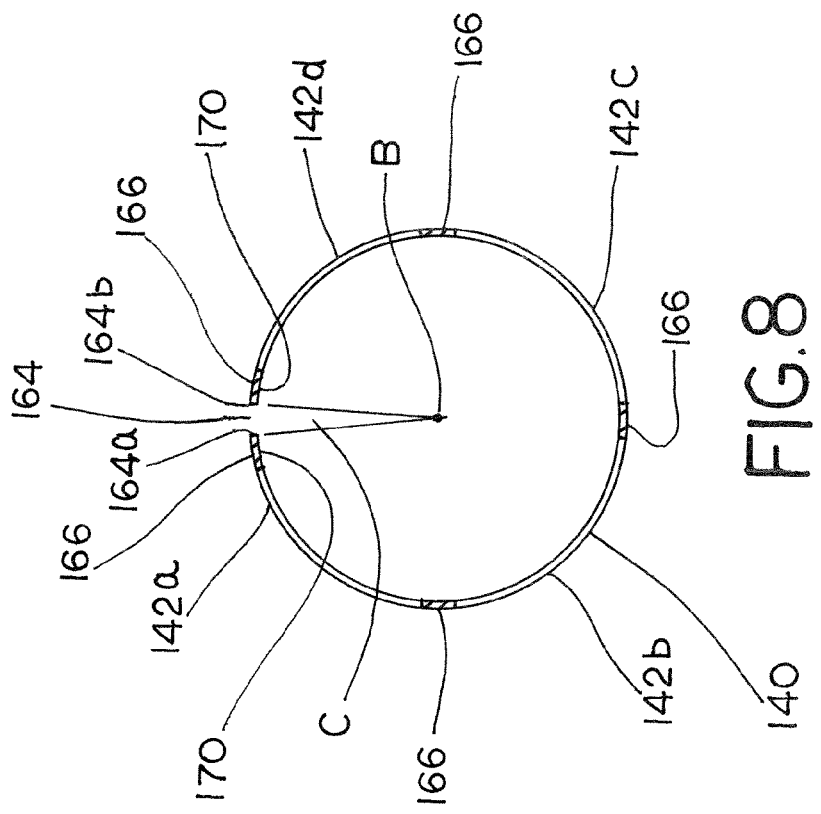
FIG. 8 is an end view of the safety cage.
Figure 7:
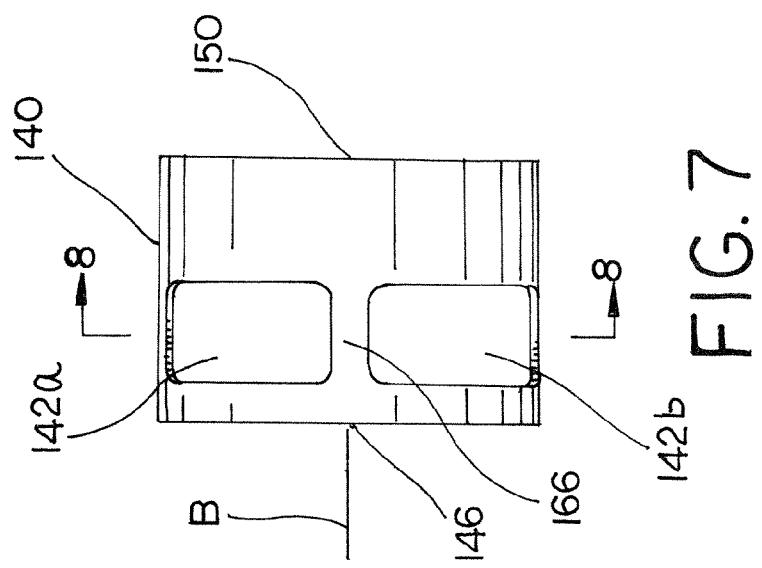
FIG. 7 is an elevational view of the safety cage of FIG. 5.

Referring now to FIGS. 7 and 8, the cage 140 is shown in an elevational view (FIG. 7) and in an end view (FIG. 8). In FIG. 8, slot 164 defined by the opposite ends 164a and 164b is shown. In accordance with the disclosed example, slot 164 is sized to leave an opening having an angle C of approximately 10° measured about the circumference of the cage 140. Further, each of the sections 166 is sized to extend approximately 10° measured about the circumference of the cage 140, while each of the apertures 142a-142d is sized to extend approximately 75° about the circumference of the cage 140. Other angles and dimensions may be chosen.

Figure 9:
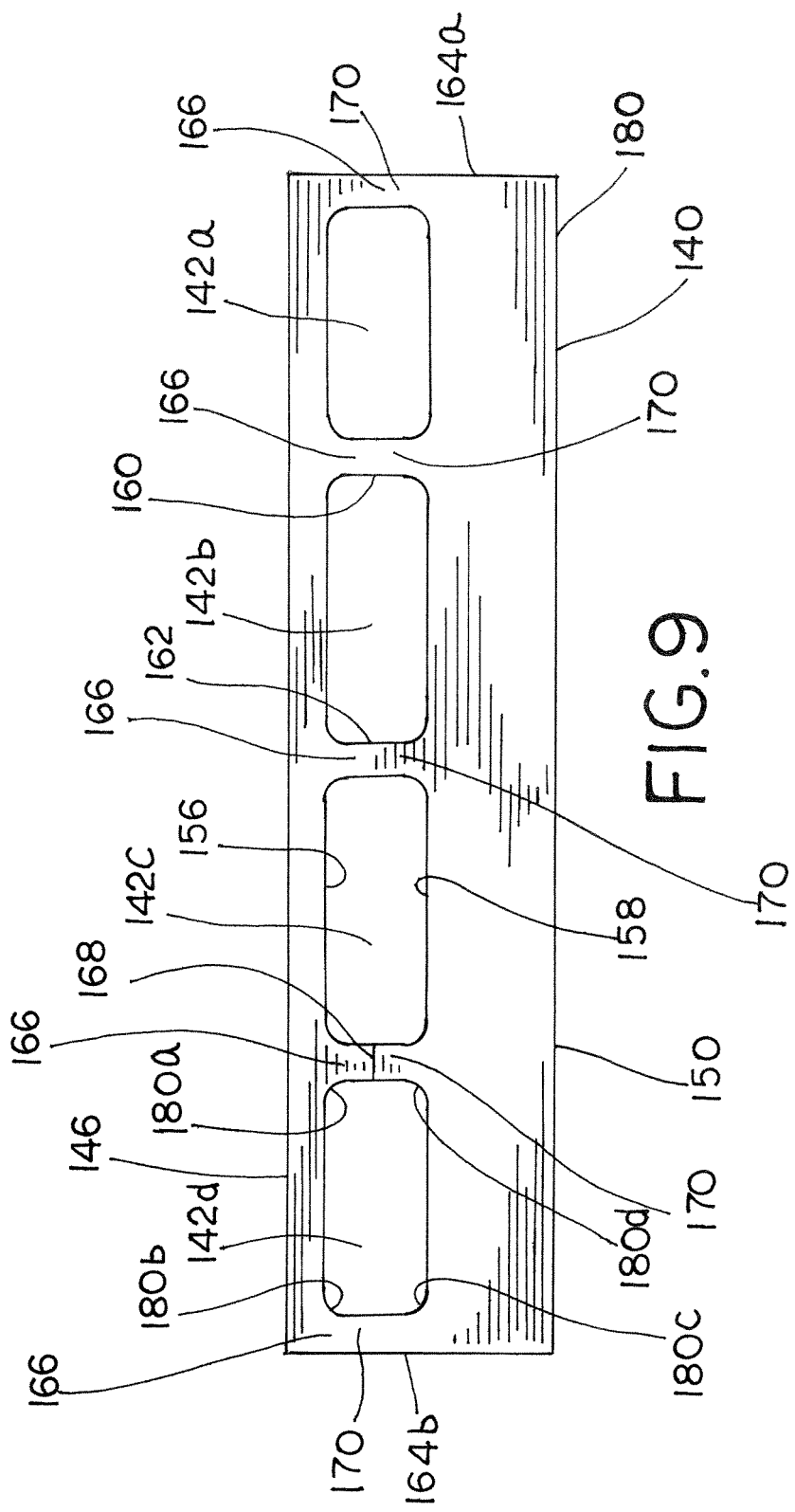
FIG. 9 is a plan view of a metal blank having apertures formed therein prior to forming the blank into the shape of FIG. 5.

Referring now to FIG. 9, the cage 140 is shown in a planar configuration prior to being formed into the cylindrical shape illustrated in the balance of the Figures. In the configuration shown, each of the apertures 142a-142d is illustrated as a generally rectangular aperture formed in a planar blank 180. Each of the apertures 142a-142d preferably includes a plurality of radiused corners 180a, 180b, 180c and 180d.

In accordance with one exemplary method, the disclosed slam-shut safety device 110 may be assembled by the valve body 112 as outlined above, including the inlet, the outlet, the flow path extending between the inlet and the outlet, and having the valve seat disposed in the valve body surrounding an orifice. The method includes providing the valve disc sized to fit within the valve body, and arranging the valve disc to shift between an open first position in which the valve disc is spaced away from the valve seat, and a closed second position in which the valve disc is seated against the valve seat. The method further includes operatively coupling the reset pin 136 to the valve disc 122 and arranging the reset pin 136 to shift relative to the valve body between the untripped position placing the valve disc in the open first position and the tripped position placing the valve disc in the closed second position, the reset pin arranged to respond to an actuator to shift the reset pin from the untripped position toward the tripped position. The cage 140 may be mounted in the valve body 112 to place the cage 140 in the flow path, and the cage 140 is provided with apertures 142, and is sized to slidably receive the valve disc 122. The cage 140 is placed within the valve body with a first end 146 of the cage mounted adjacent the valve seat 120 and with a second end 150 of the cage 140 spaced away from the valve seat 120. The cylindrical recess 154 is formed in the cage 140 adjacent the second end 150 of the cage and spaced away from the flow apertures 142, with the cylindrical recess sized to receive the valve disc when the valve disc is in the open first position.

Preferably, the method includes forming guides 170 in the cage 140, and orienting the guides 170 to extend parallel to an axis A of the valve disc 122, each of the guide sections bounding at least one of the plurality of flow apertures 142. The method may include providing the planar blank 180, which may be rectilinear, and which may be formed of stainless steel or other suitable material. The apertures 142a-142d may be formed in the blank 180 while the blank 180 is still in a planar configuration, such that the apertures appear generally rectangular. Thereafter, the metal blank 180 is rolled or otherwise suitably manipulated to form the cylindrical cage 140.

Still preferably, when the metal blank 180 is formed into the cylindrical cage 140, the opposite ends 164a and 164b are spaced apart to leave the slot 164. When the cage 140 is in the cylindrical configuration, each of the apertures 142a-142d extends partially about the circumference of the cage 140.

Figure 10:
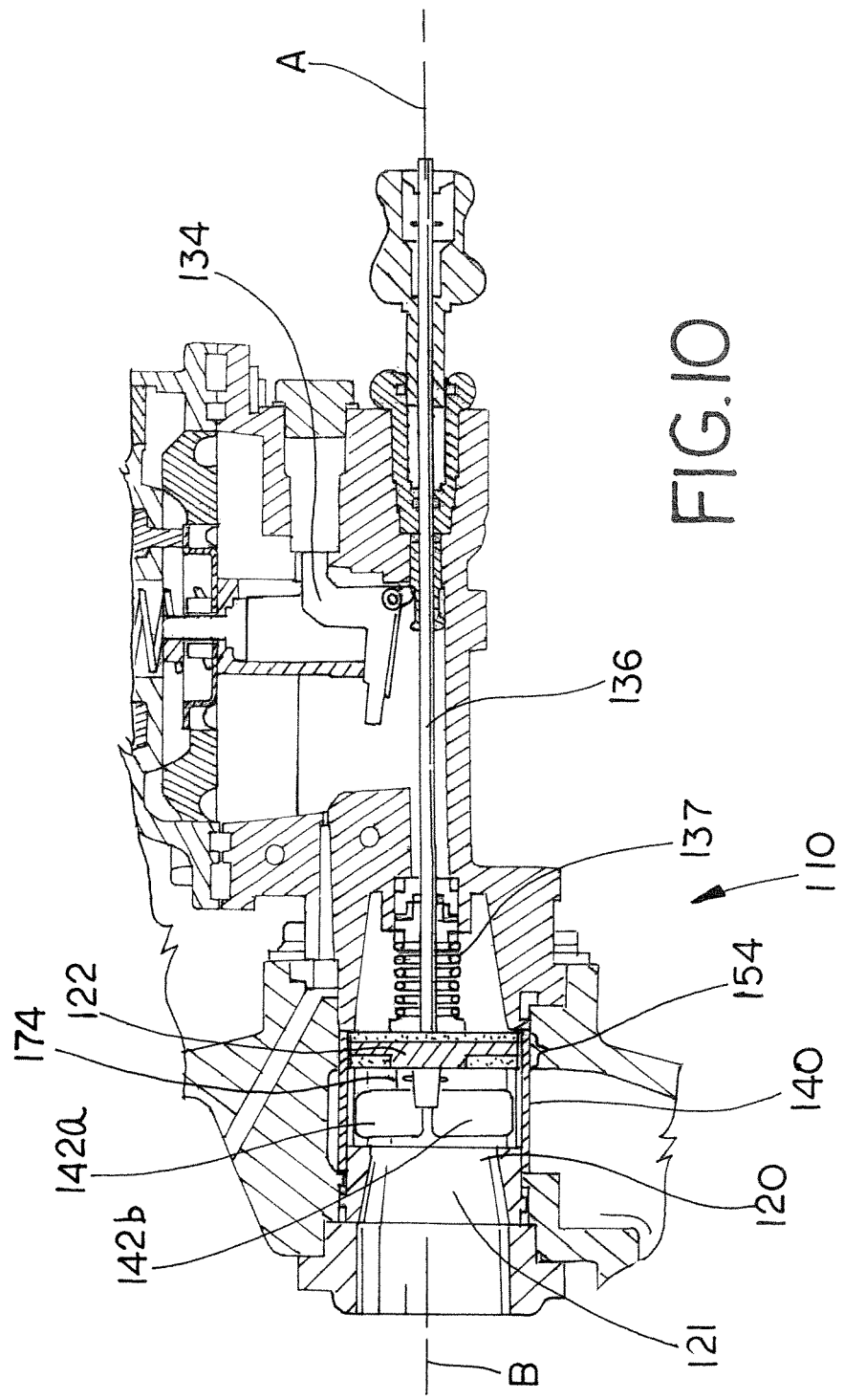
FIG. 10 is an enlarged fragmentary cross-sectional view illustrating the valve of FIG. 3 in the open position.
Figure 11:
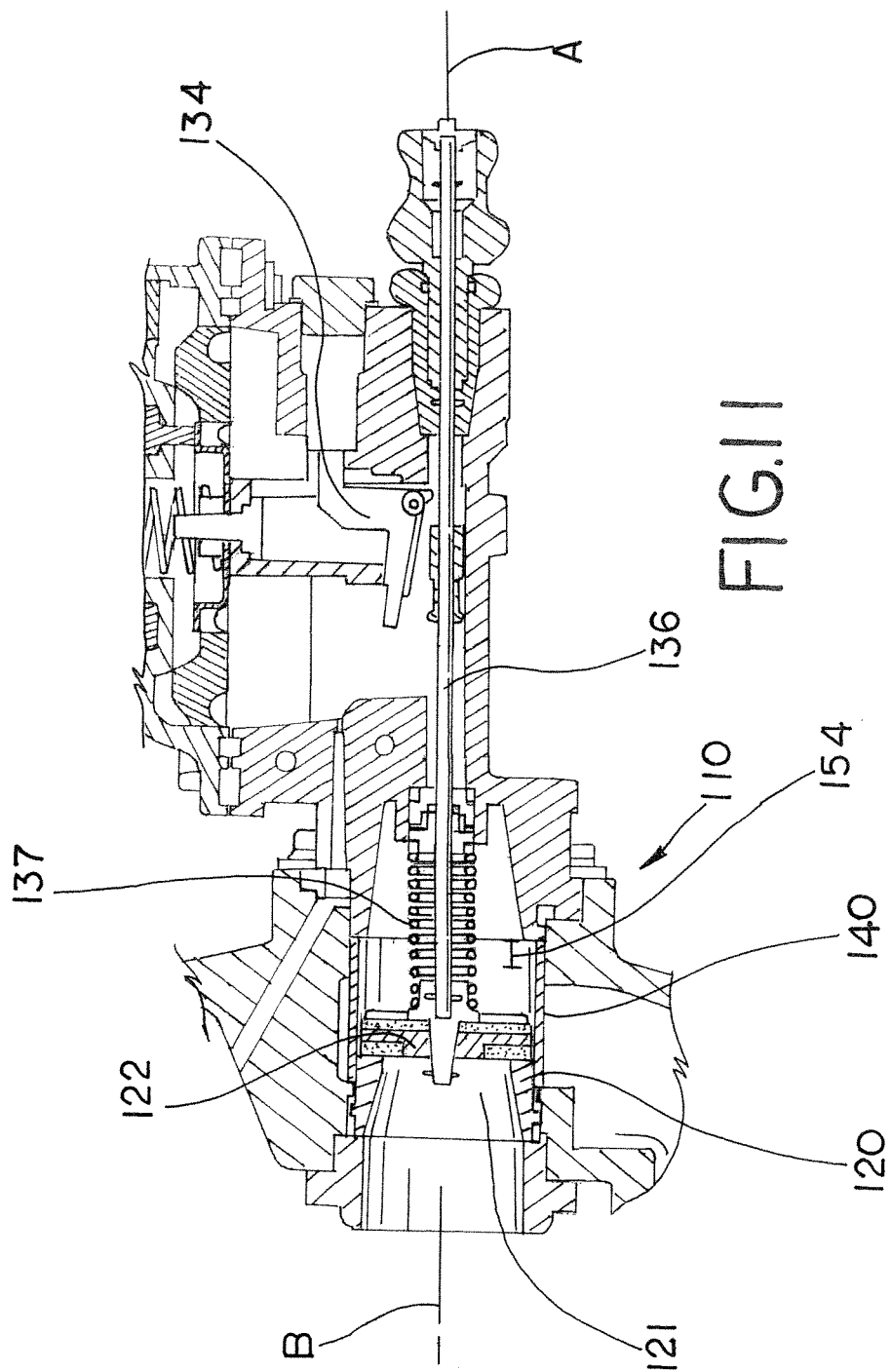
FIG. 11 is an enlarged fragmentary cross-sectional view illustrating the valve of FIG. 3 in the closed position.

Referring now to FIGS. 10 and 11, the operation of the slam shut device 110 is shown in greater detail. In FIG. 10, the reset pin 136 is retracted into the untripped or armed position, thus placing the valve disc 122 in the open position. In the open position, the valve disc is disposed in the recess 154 and separated from the apertures 142a-142d by the 174. The spring 137 is compressed and consequently biases the valve disc 122 toward the valve seat 120. The reset pin 136 and hence the valve disc 122 are maintained in the position shown by virtue of the cam 134. On the other hand, as shown in FIG. 11, upon release of the reset pin 136 by the cam 134, the reset pin 136 along with the valve disc 122 shift along their respective axes under the force of the spring 137. Consequently, the valve disc 122 moves into contact with the valve seat 120, best closing the flow orifice 121.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A slam-shut safety device, comprising:
a valve body, the valve body having an inlet, an outlet, and defining a flow path extending between the inlet and the outlet, the valve body including a valve seat surrounding an orifice disposed between the inlet and the outlet;
a valve disc, the valve disc disposed within the valve body and shiftable between an open first position in which the valve disc is spaced away from the valve seat, and a closed second position in which the valve disc is seated against the valve seat;
a reset pin operatively coupled to the valve disc and shiftable relative to the valve body between an untripped position placing the valve disc in the open first position and a tripped position placing the valve disc in the closed second position, the reset pin arranged to respond to an actuator to shift the reset pin from the untripped position toward the tripped position; and
a cage mounted within the valve body and disposed in the flow path, the cage sized to slidably receive the valve disc;
wherein the cage includes a plurality of flow apertures,
wherein the cage is cylindrical and includes a first end mounted adjacent the valve seat and a second end spaced away from the valve seat, the valve disc being retracted past the plurality of apertures and into a recess formed by the cage when the valve disc is in the open first position, and
wherein each of the plurality of apertures extends partially along a circumference of the cage, each of the plurality of apertures being bounded by a first circumferentially extending edge disposed toward the first end of the cage, a second circumferentially extending edge disposed toward the second end of the cage, and a pair of side edges extending parallel to the axis.

2. The device of claim 1, including a spring disposed within the valve body, the spring operatively coupled to the valve disc and arranged to bias the valve disc toward the closed second position.

3. The device of claim 1, wherein the valve disc shifts along an axis, and wherein the cage includes a plurality of longitudinal guides extending parallel to the axis of the valve disc, each of the plurality of apertures bounded by the longitudinal guides.

4. The device of claim 3, wherein the cage includes a slot extending parallel to the axis between the first end and the second end.

5. The device of claim 1, wherein the recess is spaced away from the second circumferentially extending edges and adjacent the second end of the cage.

6. A slam-shut safety device, comprising:
a valve body, the valve body having an inlet, an outlet, and defining a flow path extending between the inlet and the outlet, the valve body including a valve seat surrounding an orifice disposed between the inlet and the outlet;
a valve disc, the valve disc disposed within the valve body and shiftable between an open first position in which the valve disc is spaced away from the valve seat, and a closed second position in which the valve disc is seated against the valve seat;

a reset pin operatively coupled to the valve disc and shiftable relative to the valve body between an untripped position placing the valve disc in the open first position and a tripped position placing the valve disc in the closed second position, the reset pin arranged to respond to an actuator to shift the reset pin from the untripped position toward the tripped position;

a cylindrical cage mounted within the valve body and disposed in the flow path, the cage including a plurality of flow apertures and sized to slidably receive the valve disc;

the cage having a first end mounted adjacent the valve seat and a second end spaced away from the valve seat, and wherein the cage is sized to form a cylindrical recess disposed adjacent the second end of the cage and spaced away from the flow apertures, the cylindrical recess sized to receive the valve disc when the valve disc is in the open first position, wherein each of the plurality of flow apertures extends partially along a circumference of the cage, each of the plurality of flow apertures being bounded by a first circumferentially extending edge disposed toward the first end of the cage, a second circumferentially extending edge disposed toward the second end of the cage, and a pair of side edges extending parallel to the axis.

7. The device of claim 6, including a spring disposed within the valve body, the spring operatively coupled to the valve disc and arranged to bias the valve disc toward the closed second position.

8. The device of claim 6, wherein the valve disc shifts along an axis, and wherein the cage includes a plurality of longitudinal guides extending parallel to the axis of the valve disc, each of the plurality of apertures bounded by the longitudinal guides.

9. The device of claim 6, wherein the cage includes a slot extending parallel to the axis between the first end and the second end.

10. The device of claim 6, wherein the recess is spaced away from the second circumferentially extending edges.

11. A method of assembling a slam-shut safety device, the method comprising:

providing a valve body, the valve body having an inlet, an outlet, and defining a flow path extending between the inlet and the outlet;

mounting a valve seat in the valve body, the valve seat surrounding an orifice disposed in the valve body between the inlet and the outlet;

placing a valve disc sized to fit within the valve body and arranging the valve disc to shift between an open first position in which the valve disc is spaced away from the valve seat, and a closed second position in which the valve disc is seated against the valve seat;

operatively coupling a reset pin to the valve disc and arranging the reset pin to shift relative to the valve body between an untripped position placing the valve disc in the open first position and a tripped position placing the valve disc in the closed second position, the reset pin arranged to respond to an actuator to shift the reset pin from the untripped position toward the tripped position;

providing a planar and rectilinear metal blank, forming a plurality of flow apertures in the metal blank, and forming the metal blank into a cylindrical cage;

forming a longitudinal slot in the cage by leaving a gap between edges of the metal blank when forming the metal blank into the cage;

mounting the cage within the valve body to place the cage in the flow path, and sizing the cage to slidably receive the valve disc;

placing the cage within the valve body with a first end of the cage mounted adjacent the valve seat and with a second end of the cage spaced away from the valve seat; and forming a cylindrical recess in the cage adjacent the second end of the cage and spaced away from the flow apertures, the cylindrical recess sized to receive the valve disc when the valve disc is in the open first position.

12. The method of claim 11, including forming guide sections in the cage, and orienting the guide sections to extend parallel to an axis of the valve disc, each of the guide sections bounding at least one of the plurality of flow apertures.

13. The method of claim 11, including shaping the plurality of apertures on the metal blank such that the apertures extend partially along a circumference of the cage when the blank is formed into the cage.

14. The method of claim 11, including sizing the cage and the flow apertures such that the valve disc is separated from the flow apertures by a gap when the valve disc is disposed in the recess.

* * * * *

UNITED STATES PATENT AND TRADEMARK OFFICE
CERTIFICATE OF CORRECTION

| | |
|---|---|
| PATENT NO. | : 9,133,946 B2 |
| APPLICATION NO. | : 13/689460 |
| DATED | : September 15, 2015 |
| INVENTOR(S) | : Nguyen et al. |

It is certified that error appears in the above-identified patent and that said Letters Patent is hereby corrected as shown below:

On the title page item [71], delete "FISHER CONTROLS INTERNATIONAL LLC, Marshalltown, IA (US)" insert -- EMERSON PROCESS MANAGEMENT REGULATOR TECHNOLOGIES, INC., McKinney, TX (US) --.

Signed and Sealed this
Thirty-first Day of May, 2016

Michelle K. Lee
*Director of the United States Patent and Trademark Office*